Oct. 21, 1930. W. D. ANTRIM 1,779,304
BROILER FOR RANGES
Filed March 15, 1930 3 Sheets-Sheet 1

Inventor:
William D. Antrim
by his Attorneys
Howson Howson

Oct. 21, 1930.  W. D. ANTRIM  1,779,304
BROILER FOR RANGES
Filed March 15, 1930   3 Sheets-Sheet 3

Inventor:-
William D. Antrim
by his Attorneys
Howard & Howard

Patented Oct. 21, 1930

1,779,304

UNITED STATES PATENT OFFICE

WILLIAM D. ANTRIM, OF GLOUCESTER, NEW JERSEY, ASSIGNOR TO ROBERTS & MANDER STOVE COMPANY, OF PHILADELPHIA, PENNSYLVANIA, A CORPORATION OF PENNSYLVANIA

BROILER FOR RANGES

Application filed March 15, 1930. Serial No. 436,162.

My invention relates to certain improvements in the broilers of gas or electric ranges, and particularly the type in which the broiler is above the body of the range.

One object of my invention is to provide the drip-tray with bars which support the tray and extend into the pan, the bars being so formed that the tray will be raised when the pan is withdrawn and will act as a stop to limit the outward movement of the tray and the broiler. A further object of the invention is to provide means on the pan for raising the tray when the pan is inserted under the broiler.

A still further object of the invention is to provide a fixed rail at the front of the broiler compartment, which retains the pan in position when the broiler and the tray are withdrawn from the broiler, and when it is desired to remove the pan, the front edge must be raised clear of the rail.

These objects are attained in the following manner, reference being had to the accompanying drawings, in which.

Figure 1:
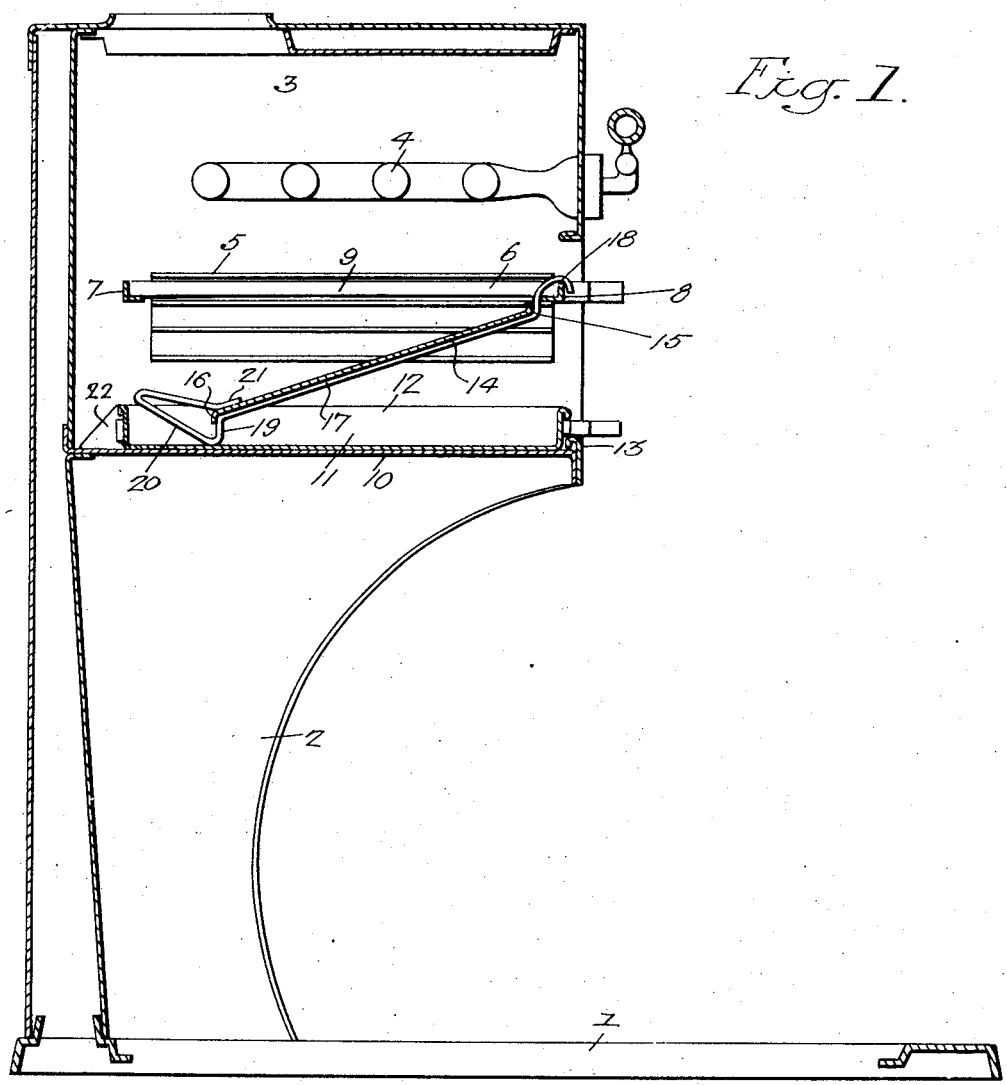
Fig. 1 is a vertical sectional view of the upper portion of a gas range illustrating my invention, showing the broiler and drip-tray within the broiler chamber.

1 is the top plate of a gas range in the present instance. 2 is the broiler frame, which is mounted above the top plate of the range. The broiler frame is made in the ordinary manner. The gas range shown in outline in the drawings is of the type used in restaurants, but it will be understood that my improvements may be used in any type of range without departing from the essential features of the invention. In the upper portion of the broiler compartment 3 are gas burners 4 of any suitable type, but it will be understood that electric heating apparatus may be substituted for the gas burners. At each side of the broiler compartment are slideways 5, on anyone of which the broiler frame 6 can be mounted. The broiler structure in the present instance consists of end bars 7 and 8 and a series of longitudinal bars 9, spaced a given distance apart and on which the meat or other food to be broiled is placed. Resting upon the bottom 10 of the compartment 3 is a drip-pan 11 having deep sides 12, and at the front of the range is a rail 13 projecting from the bottom 10, which holds the drip-pan in place, and when it is necessary to remove the drip-pan the front edge must be raised above this rail, after which the pan can be readily withdrawn.

14 is an inclined tray, by which the dripping from the meat being broiled is conveyed to the pan. This tray has a flange 15 at its upper edge and a short flange 16 at its lower edge. This lower flange is turned downwardly, while the upper flange is turend upwardly. The tray 14 is secured to two longitudinal bars 17, one bar being located near one side of the tray and the other being located near the opposite side of the tray. The upper end of each bar is bent in the form of a hook 18, which engages the outer end bar 8 of the broiler, while the lower end of each bar 17 is bent downwardly as at 19 so as to form a foot which rests on the bottom of the pan 11; it is then bent at an angle as at 20 and is returned and secured at 21 to the upper edge of the tray as shown in Fig. 1. The inclined portion 20 is at such an angle that when the pan is withdrawn the side 12 of the pan will ride under the said inclined portion 20 and will elevate the bars and the tray and will pass under the feet 19 of the bars, after which the pan can be entirely withdrawn. When the pan is inserted the beveled extensions 22 on the back of the pan 11 will raise the bars and tray clear of the rear end of the tray. When the broiler is withdrawn from the broiling compartment, as in Fig. 2, the feet 19 of the bars 17 will come in contact with the front edge of the pan and thus limit the movement of the broiler, the tray being still at such an incline that any drippings from the material being broiled will flow into the drip pan. The pan itself cannot move outwards owing to the presence of the rail.

Figure 2:
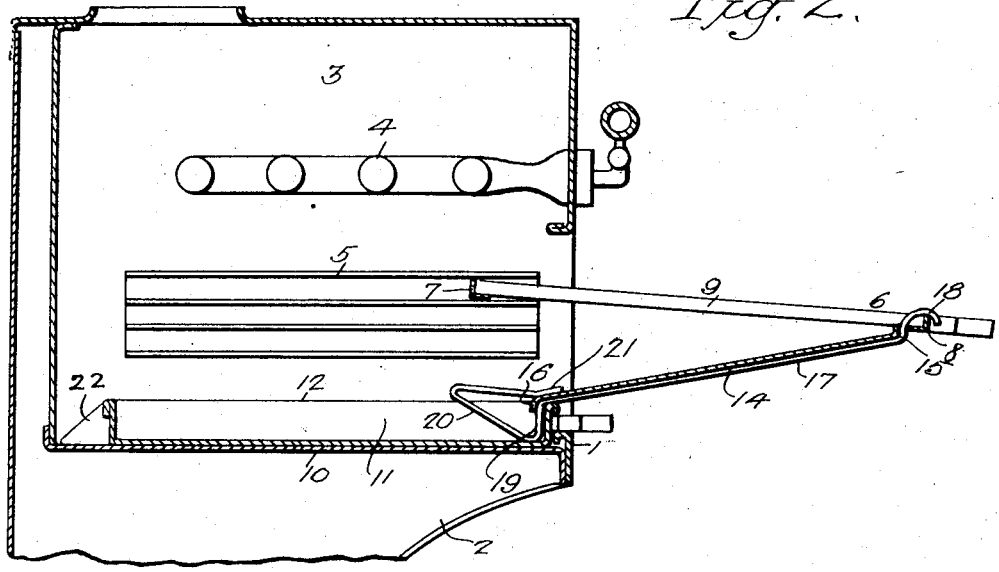
Fig. 2 is a view similar to Fig. 1, showing the broiler and drip-tray extended.
Figure 3:
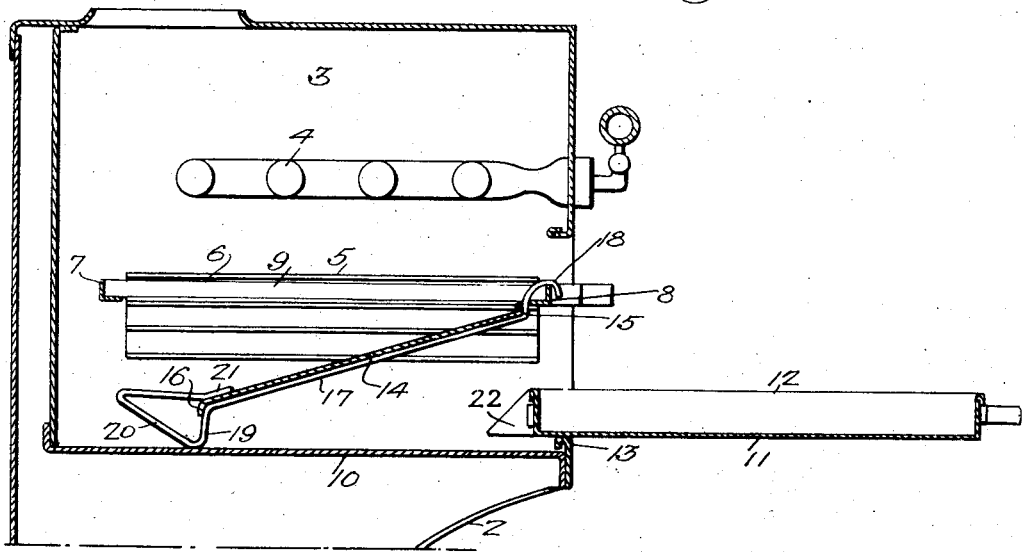
Fig. 3 is a similar view to Fig. 1, showing the drip-pan partly removed.
Figure 4:
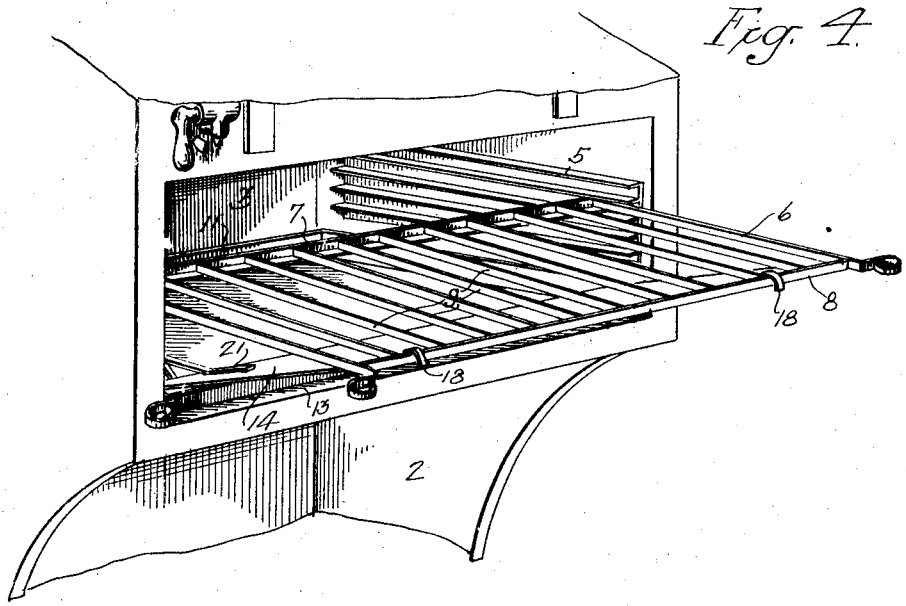
Fig. 4 is a perspective view of the broiler and drip-pin, showing the supporting bars at each side of the pan.
Figure 5:
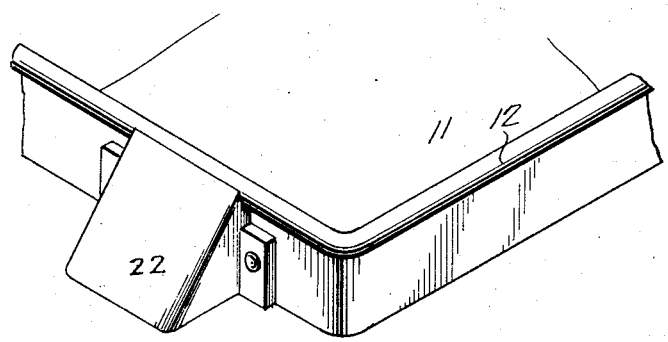
Fig. 5 is a perspective view of a portion of the drip-pan.

Thus it will be seen by the above construction that the broiler can be readily moved from the position shown in Fig. 2 and will be limited in its outward movement by the bars and front edge of the pan and rail, and the pan can be readily moved when the tray is in the position shown in Fig. 1 by simply raising the front end of the pan over the rail, and as the pan is withdrawn it will raise the bars and the tray so that it can readily pass under the tray. As the bars are comparatively narrow, the portions 19 of the bars which are within the pan will not disturb the grease in the pan as the broiler is withdrawn. The narrowness of the bars prevents any undue motion of the grease within the pan, and avoids splashing the grease onto the body of the range below the broiler.

I claim:

1. The combination in a range having a broiler compartment of a broiler frame arranged to move into and out of said broiler compartment; a drip-pan in the bottom of the said compartment; an inclined tray between the pan and the broiler frame; bars supporting the tray, being pivotally connected to the broiler frame at the front end and having feet at their inner ends resting within the drip-pan.

2. The combination in a range having a broiler compartment, of a broiler frame arranged to move into and out of said broiler compartment; a drip-pan in the bottom of the said compartment; an inclined tray between the pan and the broiler frame; bars supporting the tray, being pivotally connected to the broiler frame at the front end and having feet at their inner ends resting within the drip-pan, said feet being turned up to form inclined portions against which the rear end of the pan will come in contact when the pan is withdrawn, so that the pan will raise the tray as it is moved out of position.

3. The combination in a range having a broiler compartment, of a broiler frame arranged to move into and out of said broiler compartment; a drip-pan in the bottom of the said compartment; an inclined tray between the pan and the broiler frame; bars supporting the tray, being pivotally connected to the broiler frame at the front end and having feet at their inner ends resting within the drip-pan, said feet being turned up to form inclined portions against which the rear end of the pan will come in contact when the pan is withdrawn, so that the pan will raise the tray as it is moved out of position; and a rail at the lower front end of the broiler compartment, so as to prevent the removal of the pan unless it is raised clear of the rail, the said rail forming a stop for the pan, the tray and the broiler when the broiler is withdrawn.

4. The combination in a broiler, of a compartment, a burner in the upper portion of the compartment; a drip-pan in the lower portion of the broiler compartment; and a rail at the edge of the broiler compartment, retaining the pan in position so that the pan cannot be removed from the broiler compartment without first raising its outer end above the rail.

5. The combination in a range having a broiler compartment, of a drip-pan in the bottom of the compartment, the pan having beveled extensions at the rear; a broiler frame arranged to slide into the broiler compartment, and an inclined tray hung from the outer end of the broiler frame and having feet resting in the tray, the beveled extension on the drip-pan being located so as to raise the drip-tray when the pan is inserted into the compartment.

6. A drip-tray adapted to be attached to a broiler and to rest in the broiler compartment, said drip tray having bars at each side, bent at their upper ends to form hooks which engage the broiler frame and bent at their lower ends to form feet.

WILLIAM D. ANTRIM.